United States Patent
Hiner et al.

(10) Patent No.: US 9,217,341 B2
(45) Date of Patent: Dec. 22, 2015

(54) LUBRICATION SYSTEM FOR TOOL

(71) Applicant: Caterpillar Inc., Peoria, IL (US)

(72) Inventors: Kyle C. Hiner, Robinson, TX (US); Lauritz P. Pillers, II, McGregor, TX (US)

(73) Assignee: Caterpillar Inc., Peoria, IL (US)

( * ) Notice: Subject to any disclaimer, the term of this patent is extended or adjusted under 35 U.S.C. 154(b) by 275 days.

(21) Appl. No.: 13/967,820

(22) Filed: Aug. 15, 2013

(65) Prior Publication Data
US 2015/0047928 A1 Feb. 19, 2015

(51) Int. Cl.
| | | |
|---|---|---|
| *B23Q 11/12* | (2006.01) | |
| *F16K 31/12* | (2006.01) | |
| *F01M 11/04* | (2006.01) | |
| *F15B 13/04* | (2006.01) | |
| *F16N 11/10* | (2006.01) | |
| *F16N 29/04* | (2006.01) | |
| *F15B 20/00* | (2006.01) | |

(Continued)

(52) U.S. Cl.
CPC ............ *F01M 11/0408* (2013.01); *E02F 3/966* (2013.01); *F15B 13/0403* (2013.01); *F15B 13/0426* (2013.01); *F15B 20/00* (2013.01); *F16N 11/10* (2013.01); *F16N 29/04* (2013.01); *F15B 2211/50536* (2013.01); *F16N 2260/04* (2013.01); *Y10T 137/7762* (2015.04)

(58) Field of Classification Search
CPC ............ F15B 13/0403; F15B 13/0418; F15B 13/0422; F15B 13/0402; F15B 13/0426; F15B 13/0435; F15B 2211/50536; F15B 2211/5159; F16N 29/04; F16K 31/124; G05D 16/10; G05D 16/18; Y10T 137/7758; Y10T 137/7762; Y10T 137/7765
See application file for complete search history.

(56) References Cited

U.S. PATENT DOCUMENTS

| 1,629,730 A | 5/1927 | Penberthy |
|---|---|---|
| 1,849,819 A | 3/1932 | Bedford |

(Continued)

FOREIGN PATENT DOCUMENTS

| EP | 0486752 | 5/1992 |
|---|---|---|
| EP | 0593839 | 4/1994 |

(Continued)

OTHER PUBLICATIONS

Bekahamax EP System. Retrieved Aug. 14, 2013 from http://www.beka-lube.com/beka-ha-max-EP.php.

*Primary Examiner* — William E Dondero
*Assistant Examiner* — Minh Truong
(74) *Attorney, Agent, or Firm* — Finnegan, Henderson, Farabow, Garrett & Dunner, LLP

(57) ABSTRACT

A lubrication system for a tool powered by a drive fluid is provided. The lubrication system includes a reservoir configured to deliver a lubricant and a plunger disposed within the reservoir. The plunger is configured to selectively generate a pilot signal based on a level of the lubricant. The lubrication system further includes a valve having a housing. The housing includes a drive fluid inlet and a drive fluid outlet. The valve also includes a pilot spool configured to move from a neutral position to an actuated position in response to the pilot signal. The valve further includes a main spool selectively actuated by a pressure of the drive fluid to move from a first position to a second position in response to the movement of the pilot spool such that in the second position the drive fluid inlet is in fluid communication with the drive fluid outlet.

13 Claims, 12 Drawing Sheets

(51) Int. Cl.
    *E02F 3/96* (2006.01)
    *F15B 13/042* (2006.01)

(56) References Cited

U.S. PATENT DOCUMENTS

| | | | |
|---|---|---|---|
| 1,968,901 A | | 8/1934 | Nell |
| 1,971,772 A | | 8/1934 | Curtis |
| 2,600,348 A | * | 6/1952 | Walthers .................. 137/625.6 |
| 2,619,118 A | * | 11/1952 | Adams .................... 137/625.68 |
| 2,827,860 A | | 3/1958 | Roberts |
| 2,869,374 A | | 1/1959 | Morris |
| 3,040,835 A | | 6/1962 | Anhert |
| 3,129,788 A | | 4/1964 | Heckt |
| 3,193,028 A | | 7/1965 | Radzimovsky |
| 3,487,892 A | | 1/1970 | Kiefer |
| 3,490,549 A | | 1/1970 | Catterson |
| 3,587,782 A | | 6/1971 | Russell et al. |
| 3,595,342 A | | 7/1971 | O'Leary |
| 3,661,216 A | | 5/1972 | Yamanaka |
| 3,664,462 A | | 5/1972 | Smith |
| 3,749,186 A | | 7/1973 | Kutuzov et al. |
| 3,768,376 A | * | 10/1973 | Orme ............................ 91/466 |
| 3,774,700 A | | 11/1973 | Shepherd |
| 3,966,019 A | | 6/1976 | Heikkila et al. |
| 4,090,429 A | * | 5/1978 | Kamimura ...................... 91/466 |
| 4,149,602 A | | 4/1979 | James |
| 4,157,121 A | | 6/1979 | Amtsberg et al. |
| 4,190,116 A | | 2/1980 | O'Neal |
| 4,289,209 A | | 9/1981 | Salmi |
| 4,333,538 A | | 6/1982 | Ekwall |
| 4,440,191 A | * | 4/1984 | Hansen ........................ 137/468 |
| 4,474,248 A | | 10/1984 | Musso |
| 4,526,201 A | * | 7/1985 | Geyler et al. ............. 137/625.63 |
| 4,598,796 A | | 7/1986 | Barrows |
| 4,793,719 A | | 12/1988 | Crockett et al. |
| 4,844,125 A | * | 7/1989 | McKay et al. ........... 137/625.65 |
| 5,060,761 A | | 10/1991 | Arndt et al. |
| 5,234,092 A | * | 8/1993 | Mahoney .................. 192/48.601 |
| 5,293,959 A | | 3/1994 | Kimberlin |
| 5,351,763 A | | 10/1994 | Muuttonen |
| 5,385,209 A | | 1/1995 | Bodell et al. |
| 5,549,031 A | | 8/1996 | Giordano |
| 5,562,170 A | | 10/1996 | Wolfer et al. |
| 5,653,295 A | | 8/1997 | Juvonen et al. |
| 6,070,678 A | | 6/2000 | Pascale |
| 6,116,301 A | | 9/2000 | Deimel et al. |
| 6,145,625 A | | 11/2000 | Prokop et al. |
| 6,273,199 B1 | | 8/2001 | Kiikka et al. |
| 6,405,810 B1 | | 6/2002 | Grach et al. |
| 6,510,904 B1 | | 1/2003 | Tyrrell |
| 6,631,787 B2 | | 10/2003 | Conley et al. |
| 6,981,439 B2 | | 1/2006 | Hart |
| 7,694,748 B2 | | 4/2010 | Oksman |
| 2006/0048957 A1 | | 3/2006 | Oksman |
| 2006/0243528 A1 | | 11/2006 | Bukhari et al. |
| 2007/0187181 A1 | | 8/2007 | Brendel |
| 2007/0267078 A1 | * | 11/2007 | Collet et al. ............. 137/625.69 |
| 2009/0277657 A1 | | 11/2009 | Berger et al. |
| 2010/0236652 A1 | * | 9/2010 | Hattori ...................... 137/625.42 |
| 2010/0301248 A1 | | 12/2010 | Yamamoto et al. |
| 2010/0319662 A1 | * | 12/2010 | Seiyama et al. ........... 123/568.23 |
| 2012/0043163 A1 | | 2/2012 | Jagdale et al. |
| 2012/0152377 A1 | * | 6/2012 | Tabor et al. ................. 137/487.5 |

FOREIGN PATENT DOCUMENTS

| | | |
|---|---|---|
| EP | 0935090 | 8/1999 |
| EP | 1112820 | 7/2001 |
| EP | 1321245 | 6/2003 |
| FR | 2909745 | 6/2008 |
| JP | 57190894 | 11/1982 |
| JP | 2003340747 | 12/2005 |
| WO | 0233309 | 4/2002 |
| WO | WO 03/053639 A1 | 7/2003 |
| WO | WO 2010/133271 A1 | 11/2010 |

* cited by examiner

LUBRICATION SYSTEM FOR TOOL

TECHNICAL FIELD

The present disclosure relates to a lubrication system for a tool, and more specifically a lubrication system for a tool powered by a drive fluid.

BACKGROUND

A powered tool, for example a demolition hammer, is used on work sites to break up objects such as rocks, concrete, asphalt, frozen ground, or other hard objects. The hammer may be mounted on a machine, such as a back hoe and/or an excavator, or may be handheld. The hammer may be powered by a hydraulic or pneumatic pressure source. In operation, a high pressure fluid drives a piston to strike a working member such as a tool bit, which in turn, strikes against rock, concrete, asphalt or other hard objects.

A lubrication system is used to supply a lubricant, such as grease, to bearing surfaces in the hammer to reduce friction between moving parts, such as between the tool bit and bushings that are used to align the tool bit. The lubrication system may be separate from the hammer, for example by being mounted on a carrier machine, or mounted to the hammer, i.e. an on-board system. In order to monitor the amount of the lubricant remaining, many systems provide inspection windows, so that an operator can visually monitor the amount of the lubricant remaining. However, such systems are dependent on the operator taking the necessary steps to manually check the window.

Hence, there is a need of an improved lubrication system to reduce dependency on the operator for keeping check on the amount of the lubricant remaining.

U.S. Published Application Number 20120043163 discloses a lubrication system for a tool powered by a drive fluid. The lubrication system includes a valve member movable from a first position to a second position in response to receiving an input indicative of a low level of a lubricant. In the second position, the valve member is configured to divert the drive fluid to shutdown or derate the tool.

SUMMARY OF THE DISCLOSURE

In one aspect of the present disclosure, a lubrication system for a tool powered by a drive fluid is provided. The lubrication system includes a reservoir configured to deliver a lubricant and a plunger disposed within the reservoir. The plunger is configured to selectively generate a pilot signal based on a level of the lubricant. The lubrication system further includes a valve. The valve includes a housing having a drive fluid inlet and a drive fluid outlet. The valve also includes a pilot spool provided at least partly within the housing and is configured to move from a neutral position to an actuated position in response to the pilot signal from the plunger. The valve further includes a main spool having a hollow portion at least partially surrounding the pilot spool. The main spool is selectively actuated by a pressure of the drive fluid to move from a first position to a second position in response to the movement of the pilot spool such that in the second position the drive fluid inlet is in fluid communication with the drive fluid outlet.

In another aspect of the present disclosure, a valve is provided. The valve includes a housing having a drive fluid inlet and a drive fluid outlet. The valve also includes a pilot spool provided at least partly within the housing and is configured to move from a neutral position to an actuated position in response to a pilot signal based on a level of a lubricant. The valve further includes a main spool having a hollow portion at least partially surrounding the pilot spool. The main spool is selectively actuated by a pressure of a drive fluid to move from a first position to a second position in response to the movement of the pilot spool such that in the second position the drive fluid inlet is in fluid communication with the drive fluid outlet.

In yet another aspect of the present disclosure, a tool powered by a drive fluid is provided. The tool includes a high pressure line configured to deliver drive fluid at high pressure to the tool and a low pressure line configured to return drive fluid at low pressure from the tool. The tool further includes a valve. The valve includes a housing having a drive fluid inlet and a drive fluid outlet. The drive fluid inlet is in fluid communication with the high pressure line and the drive fluid outlet is in fluid communication with the low pressure line. The valve also includes a pilot spool provided at least partly within the housing and is configured to move from a neutral position to an actuated position in response to a pilot signal based on a level of a lubricant. The valve further includes a main spool having a hollow portion at least partially surrounding the pilot spool. The main spool is selectively actuated by a pressure of the drive fluid to move from a first position to a second position in response to the movement of the pilot spool such that in the second position the drive fluid inlet is in fluid communication with the drive fluid outlet.

Other features and aspects of this disclosure will be apparent from the following description and the accompanying drawings.

DETAILED DESCRIPTION

Figure 1:
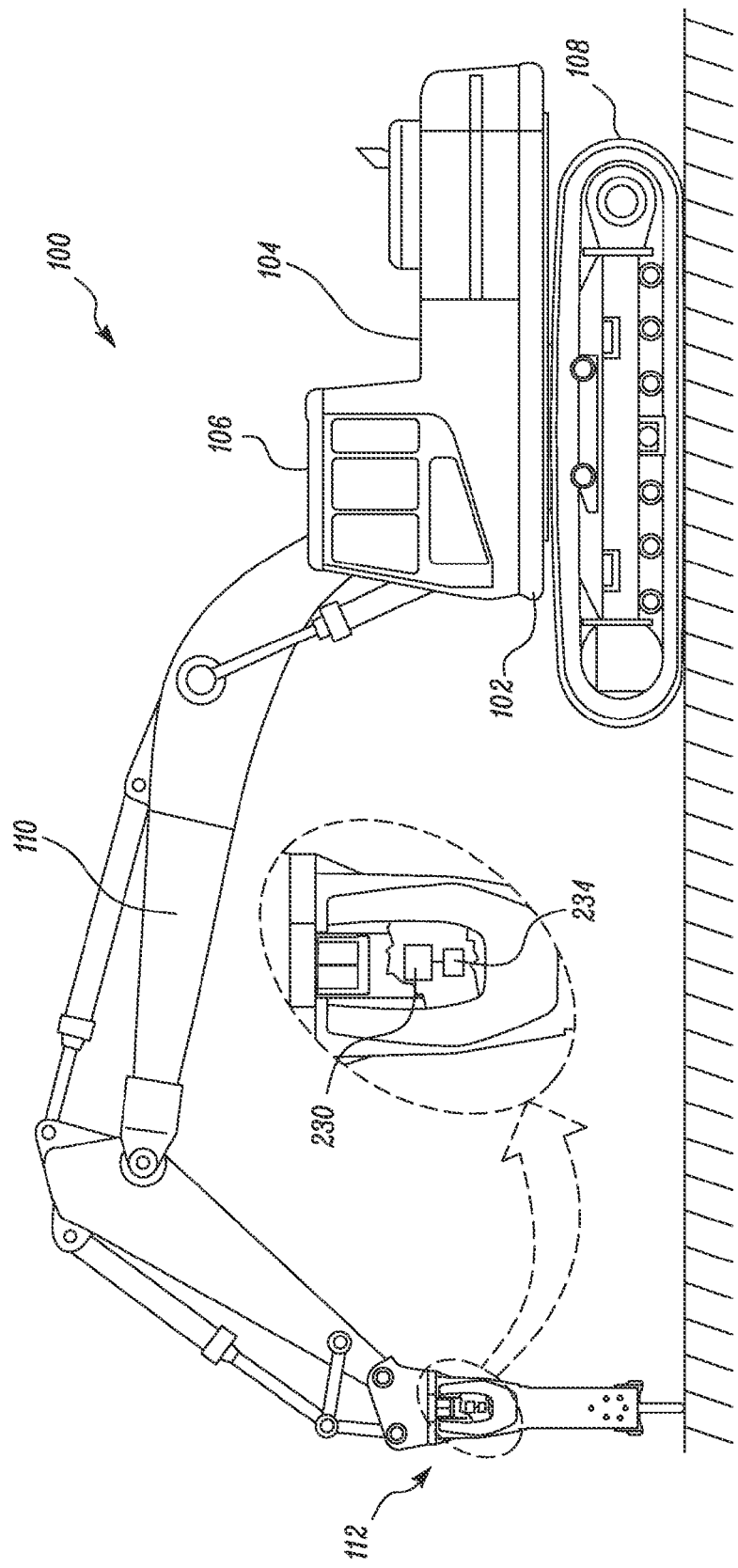
FIG. 1 is an exemplary machine, according to one embodiment of the present disclosure.

Wherever possible, the same reference numbers will be used throughout the drawings to refer to the same or the like parts. Referring to FIG. 1, an exemplary machine 100 is illustrated. More specifically, the machine 100 is a hydraulic excavator. Alternately, the machine 100 may be a roof bolter, a back hoe, a rock drill or any other machine. It should be noted that the machine 100 may be any other machine associated with industries including, but not limited to, agriculture, forestry, mining, transportation, construction, waste management and the like.

The machine 100 includes a frame and/or a chassis 102. A casing 104 may be provided on the frame 102. The casing 104 may house a power source (not shown). The power source may be any power source known in the art or a combination thereof, for example, an internal combustion engine, batteries, electric motor, or the like. Further, the casing 104 may house other components and systems of the machine 100 including, but not limited to, pneumatic, hydraulic, electrical and electronic. An operator cabin 106 may be provided on the frame 102 of the machine 100. The operator cabin 106 may include various controls for operation of the machine 100. A set of ground engaging members 108, such as tracks or wheels, may be provided on the frame 102. The ground engaging members 108 may provide mobility to the machine 100.

Further, the machine 100 may include a boom 110 directly or indirectly mounted to the frame 102 of the machine 100. A tool 112 powered by a drive fluid may be attached to the boom 110. As shown in an exploded cut away view of the tool 112, the tool 112 includes a reservoir 230 fluidly coupled to a valve 234. The reservoir 230 and the valve 234 will be explained in detail in the accompanying figures. In the illustrated embodiment, the tool 112 is a hydraulically powered tool, such as a demolition hammer. A hydraulic system (not shown) of the machine 100 may be used to power the tool 112. Thus, the drive fluid may be a hydraulic fluid. It should be noted that the tool 112 may be any other tool and may be powered by a combination with other means like pneumatic system and/or electrical systems as per application.

Figure 2:
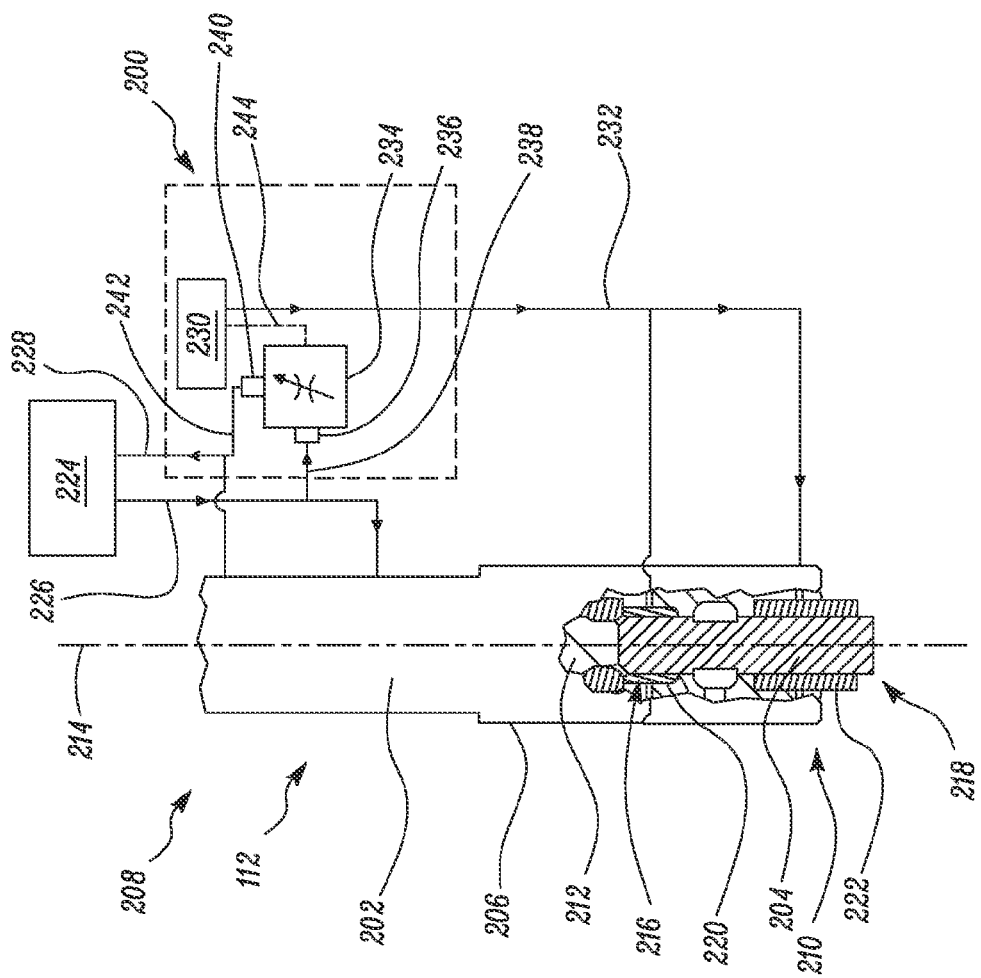
FIG. 2 is a schematic illustration of an exemplary tool provided with a lubrication system.

FIG. 2 shows a schematic illustration of a lubrication system 200 for the tool 112, according to an embodiment of the present disclosure. The tool 112 includes a power cell 202 and a working member 204. The power cell 202 includes an enclosure 206 having an upper end 208 and a lower end 210. The enclosure 206 may be formed as a single piece or may consist of a plurality of pieces, and may be configured in a variety of ways known in the art. A piston 212 is disposed within the enclosure 206 and is movable along an axis 214. The working member 204 is also disposed within the enclosure 206 and is movable along the axis 214. The working member 204 includes a first end 216 and a second end 218. The first end 216 is configured and positioned in the enclosure 206 to be struck by the piston 212. The second end 218 of the working member 204 extends from the lower end 210 of the enclosure 206. The power cell 202 is configured to provide a breaking force via the second end 218 of the working member 204 to an object, such as rocks, concrete, asphalt, frozen ground, or other hard objects.

The power cell 202 may also include an upper bushing 220 and a lower bushing 222. The upper bushing 220 and the lower bushing 222 are fixedly held within the enclosure 206 by cross pins or other suitable means. The working member 204 is slidably received with the upper bushing 220 and the lower bushing 222 in the enclosure 206. Further, the working member 204 is slidably retained within the enclosure 206 by retaining pins or other suitable retention devices.

A drive fluid source 224 may be associated with the tool 112. The drive fluid source 224 may be configured to deliver the drive fluid at high pressure to the tool 112 via a high pressure line 226 for use in driving the piston 212. A pressure source, such as a fluid pump (not shown) or other suitable pressure source may be associated with the drive fluid source 224 to pressurize the drive fluid. Further, the drive fluid source 224 may be configured to receive the drive fluid at low pressure from the tool 112 via a low pressure line 228.

The lubrication system 200 associated with the tool 112 is depicted within a dashed box. The lubrication system 200 and the power cell 202 may be formed integrally as a unit. Alternatively, the lubrication system 200 may be externally mounted, for example, by being mounted on a carrier machine or an on-board system that is mounted on the tool 112. The lubrication system 200 may be in fluid communication with the tool 112 via additional hoses or other conduits.

The lubrication system 200 includes the reservoir 230. The reservoir 230 may be configured to deliver any suitable lubricant such as grease to the tool 112. The reservoir 230 is in fluid communication with the tool 112 via a lubricant line 232. The lubricant line 232 may be configured to provide the lubricant to each of the upper bushing 220 and the lower bushing 222. For ease of illustration, a portion of the lubricant line 232 is shown external to the enclosure 206, though in some embodiments, the lubricant line 232 may include internally formed conduits within the enclosure 206.

The lubrication system 200 includes the valve 234. The valve 234 includes a drive fluid inlet 236. The drive fluid inlet 236 is in fluid communication with the high pressure line 226 via a first line 238. The drive fluid inlet 236 is configured to receive the drive fluid at high pressure from the high pressure line 226. The valve 234 also includes a drive fluid outlet 240. The drive fluid outlet 240 is in fluid communication with the low pressure line 228 via a second line 242. It may be apparent that the first and the second lines 238, 242 enable the valve 234 to be connected parallel relative to the high and low pressure lines 226, 228. As illustrated in FIG. 2, the connections of the valve 234 with the high and low pressure lines 226, 228 are purely exemplary in nature, and the valve 234 may be connected to the high and low pressure lines 226, 228 in any alternative manner. For example, the high and low pressure lines 226, 228 may directly pass through the valve 234.

The valve 234 is also configured to receive a pilot signal 244 from the reservoir 230. The pilot signal 244 may be indicative of a level of the lubricant present in the reservoir 230. The pilot signal 244 may be any suitable input. For example, in one embodiment, the pilot signal 244 may be a mechanical input such as a physical engagement or contact between two parts. In alternative embodiments, the pilot signal 244 may be an electrical, magnetic, hydraulic or a combination thereof. Based on the pilot signal 244, a status of the valve 234 may change. Accordingly, the valve 234 may be configured to divert at least a portion of the drive fluid at high pressure from the high pressure line 226 to the low pressure line 228. This may reduce an operating capacity of the tool 112 as will be explained in detail hereinafter.

Figure 3:
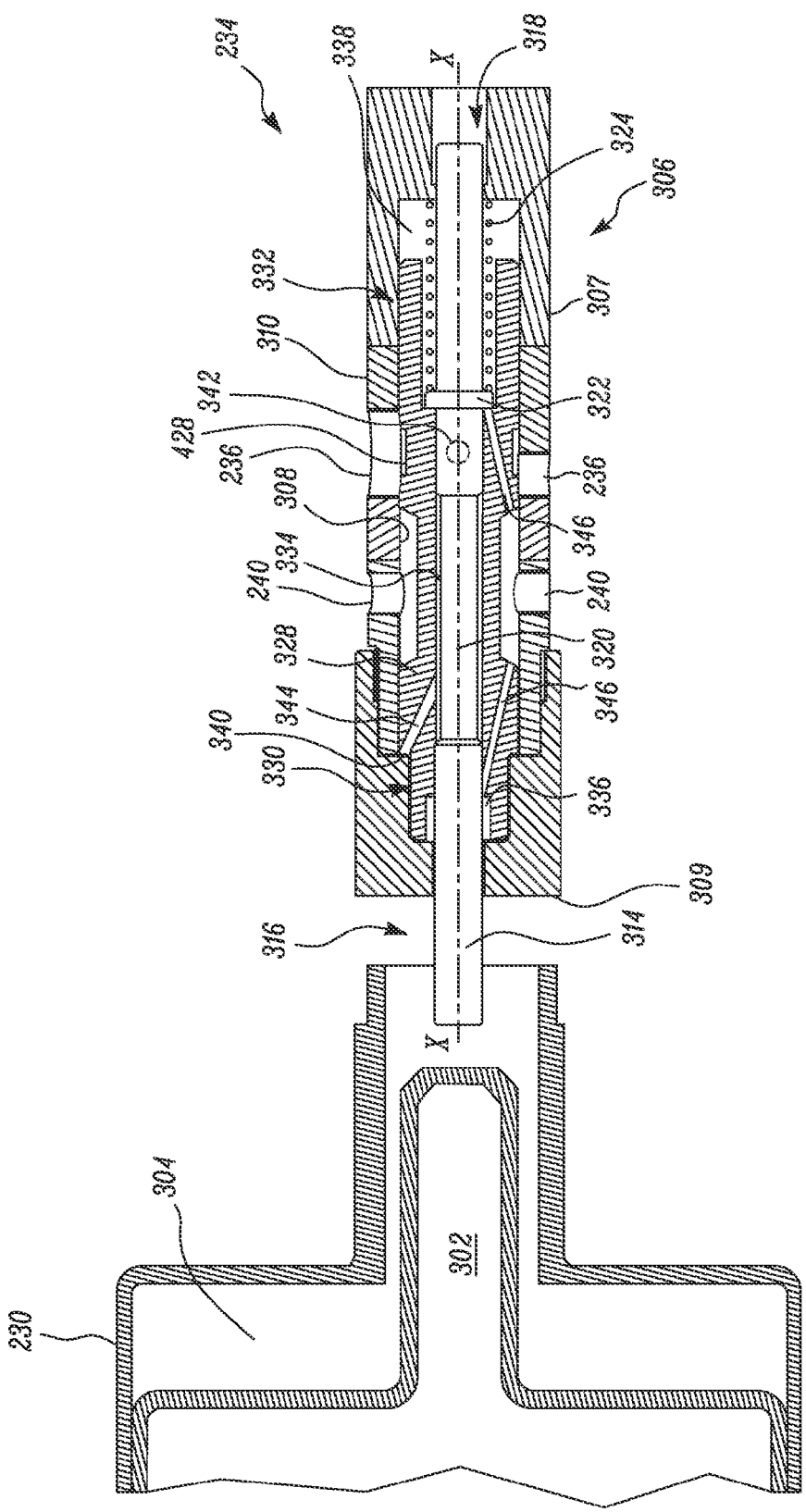
FIG. 3 is a partial cross sectional view of a reservoir and a valve of the lubrication system, according to an embodiment of the present disclosure.

FIG. 3 illustrates a partial cross sectional view of the reservoir 230 and the valve 234, according to an embodiment of the present disclosure. The reservoir 230 includes a plunger 302 disposed therein. A lubricant 304 may be provided in a cavity between the reservoir 230 and the plunger 302. The plunger 302 may be configured to move from a raised position to a lowered position within the reservoir 230 based on the level of the lubricant 304 remaining in the reservoir 230.

The valve 234 may include a housing 306. The housing 306 includes a main body 307 and a cap 309 together defining an inner surface 308 and an outer surface 310. The inner surface 308 of the housing 306 defines a substantially hollow portion. The cap 309 may be press-fit or joined with a threaded connection on the main body 307. In alternative embodiments, the housing 306 may be a single component (not shown). The inner and outer surfaces 308, 310 of the housing 306 may be sized and shaped accordingly to accommodate various components of the valve 234 and as per system design and requirements. Further, the drive fluid inlet 236 and the drive fluid outlet 240 may be provided in the main body 307 of the housing 306. The drive fluid inlet 236 and the drive fluid outlet 240 are connected to the first line 238 and the second line 242, respectively, as shown in FIG. 2. Additionally, one or more ports (not shown) may be provided in the main body 307 of the housing 306. The ports may be configured to provide access to the interior of the valve 234 for testing and/or maintenance purposes.

A pilot spool 314 may be provided within the housing 306 in a manner such that the housing 306 at least partially encloses the pilot spool 314. The pilot spool 314 may have a substantially cylindrical configuration. Further, the pilot spool 314 has a solid construction. The pilot spool 314 may have a first end 316 and a second end 318. A diameter of the first end 316 may be equal to or different than a diameter of the second end 318. A narrow portion 320 may be provided on the pilot spool 314 between the first and second ends 316, 318. A diameter of the narrow portion 320 may be substantially smaller than the diameter of the first and/or second ends 316, 318. Further, a radial projection 322 may be provided on the second end 318 in a manner such that the radial projection 322 extends radially away from a surface of the pilot spool 314. A diameter of the radial projection 322 may be greater than the diameter of the second end 318. The pilot spool 314 may be configured to move along a longitudinal axis X-X within the housing 306 between a neutral position (as shown in FIG. 3) and an actuated position (shown in FIG. 8).

A pilot spring 324 may be provided between the radial projection 322 and the housing 306. The pilot spring 324 may cooperate with the radial projection 322 to urge the pilot spool 314 in the neutral position within the housing 306. The pilot spool 314 may be configured to receive the pilot signal 244 from the plunger 302. Based on the pilot signal 244, the pilot spool 314 may be configured to move from the neutral position to the actuated position, as described in detail hereinafter with reference to FIGS. 6-9. The pilot spool 314 may be supported within the housing 306 at the first and second ends 316, 318. Suitable sealing members may be used at the first and second ends 316, 318 to provide support and sealing between the pilot spool 314 and the housing 306.

Figure 4:
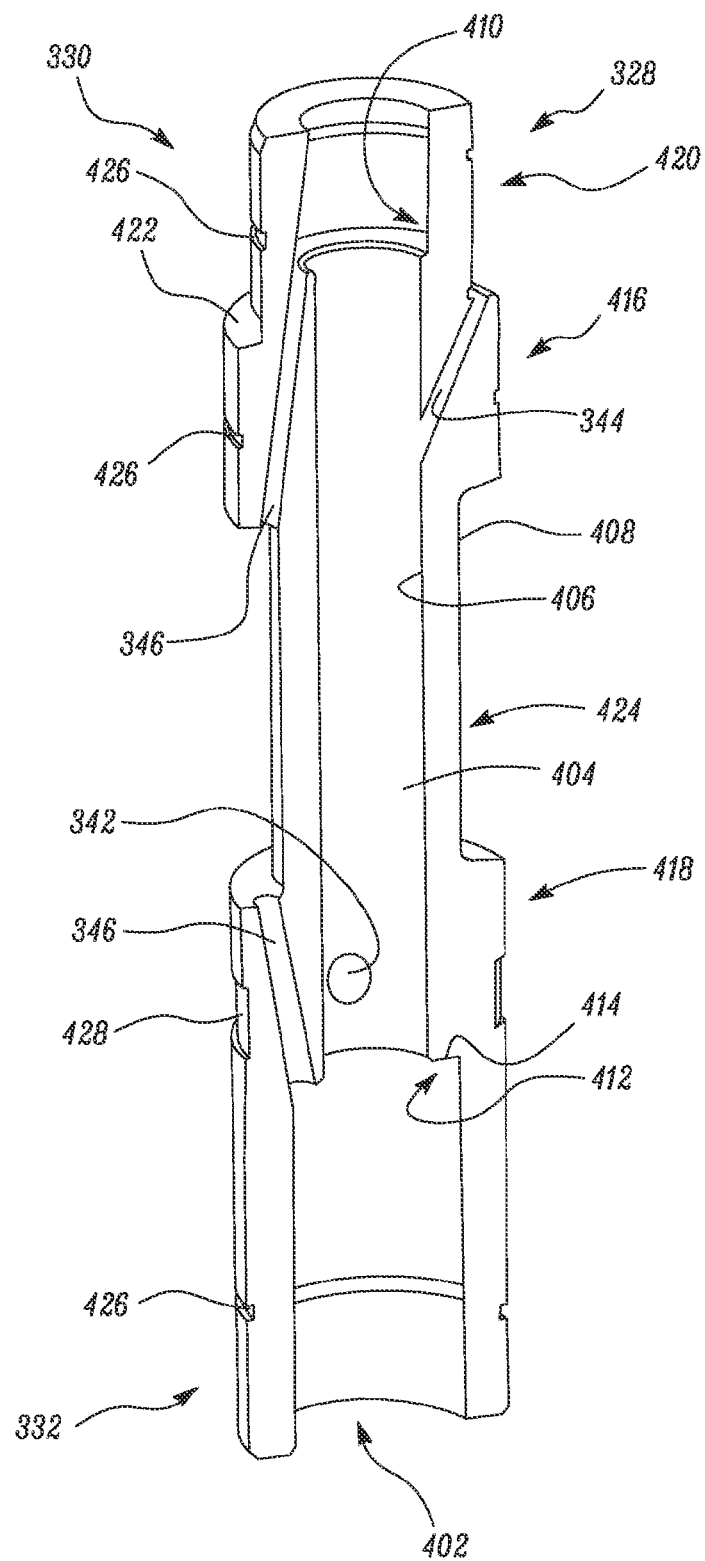
FIGS. 4-5 are cross-sectional views of a main spool of the valve, according to an embodiment of the present disclosure.
Figure 5:
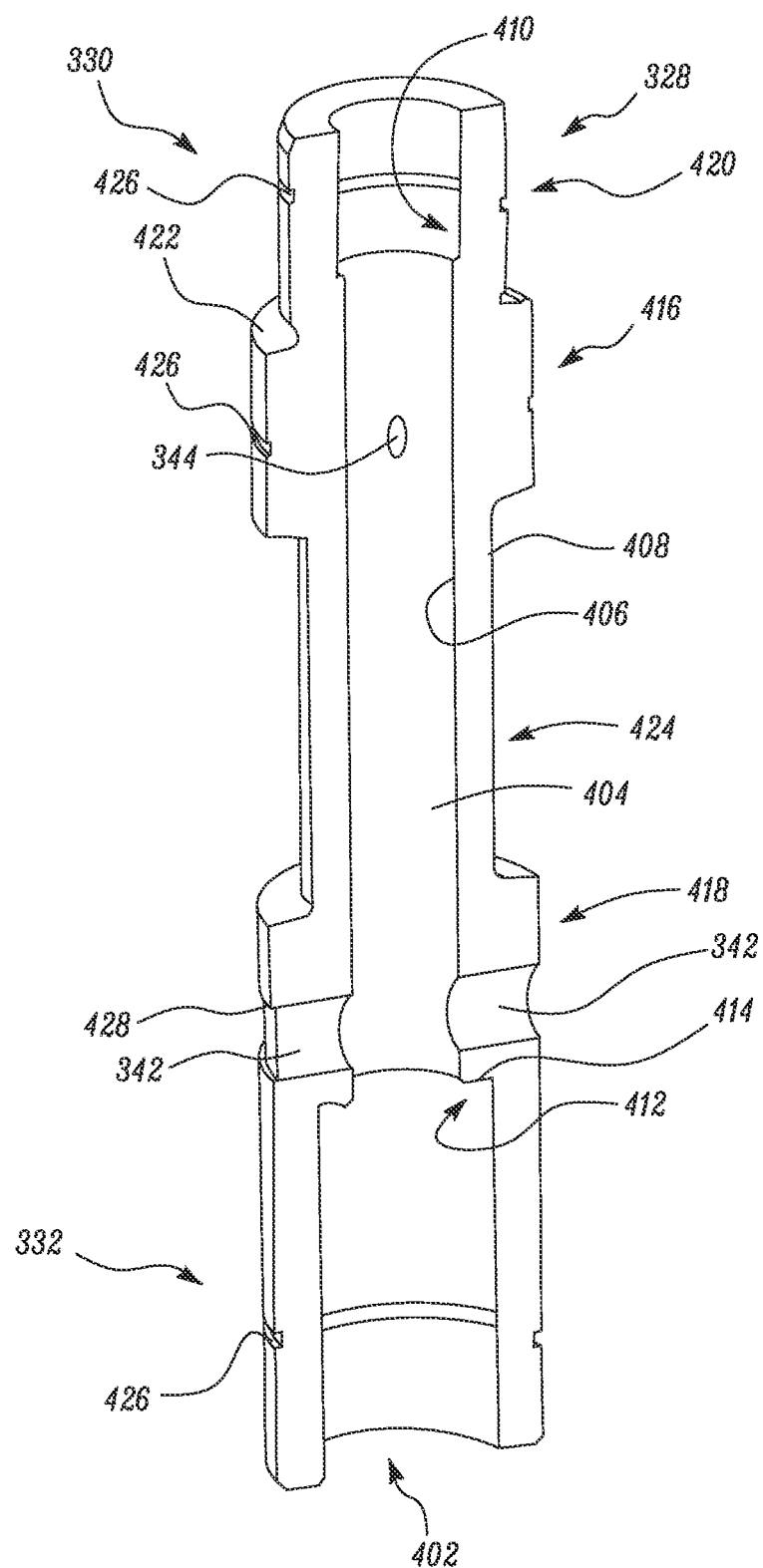

Further, a main spool 328 may be provided within the housing 306. Referring to FIGS. 3-5, the main spool 328 is illustrated. The main spool 328 is configured to move along the longitudinal axis X-X within the housing 306 between a first position (shown in FIG. 3) and a second position (shown in FIG. 9) based on actuation by a pressure of the drive fluid. The main spool 328 has a first end 330 and a second end 332. The main spool 328 has a substantially cylindrical configuration including a hollow portion 402. The hollow portion 402 at least partly defines a longitudinal passage 404 extending axially within the main spool 328. The main spool 328 includes an inner surface 406 surrounding the hollow portion 402 and an outer surface 408. The pilot spool 314 is disposed within the hollow portion 402 such that the main spool 328 at least partially surrounds the pilot spool 314. The disposition of the pilot spool 314 in the hollow portion 402 of the main spool 328 provides an annular channel 334 between the inner surface 406 of the main spool 328 and the narrow portion 320 of the pilot spool 314.

The hollow portion 402 has a first inner stepped portion 410 and a second inner stepped portion 412 proximate to the first and second ends 330, 332, respectively, on both sides of the longitudinal passage 404 of the main spool 328. The second chamber 338 is sized and configured to receive the radial projection 322 of the pilot spool 314. Additionally, an inner shoulder 414 is formed in the second inner stepped portion 412. The inner shoulder 414 cooperates with the radial projection 322 of the pilot spool 314 and urges the main spool 328 in the first position when the pilot spool 314 is in the neutral position.

Further, the main spool 328 includes a first outer stepped portion 416 and a second outer stepped portion 418 formed on the outer surface 408. Additionally, the main spool 328 includes a narrow section 420 adjacent to the first outer stepped portion 416 such that a diameter of the narrow section 420 is smaller than a diameter of the first outer stepped portion 416. The narrow section 420 is configured to provide an outer shoulder 422 on the first outer stepped portion 416. The outer shoulder 422 in cooperation with the inner surface 308 of the housing 306 provides an actuation chamber 340 adjacent to the first outer stepped portion 416.

The second outer stepped portion 418 is provided in cooperation with the drive fluid inlet 236 such that the second outer stepped portion 418 blocks the drive fluid inlet 236 from the drive fluid outlet 240 in the first position of the main spool 328. The diameter of the first outer stepped portion 416 may be equal to a diameter of the second outer stepped portion 418. A central portion 424 is disposed between the first and second outer stepped portions 416, 418 such that a diameter of the central portion 424 may be substantially smaller than the diameters of the first and/or second outer stepped portions 416, 418. The central portion 424 is configured to provide fluid communication between the drive fluid inlet 236 and the drive fluid outlet 240 when the main spool 328 may shift to the second position (shown in FIG. 9).

A number of circumferential indentations 426 may be provided on both the first and second outer stepped portions 416, 418 in a longitudinal spaced apart arrangement. In the illustrated embodiment, one circumferential indentation 426 is provided on each of the first and second outer stepped portions 416, 418. The circumferential indentation 426 may facilitate sealing between surfaces of the first and second outer stepped portions 416, 418 and the inner surface 308 of the housing 306.

The main spool 328 includes a circumferential groove 428 provided on the second outer stepped portion 418. The circumferential groove 428 is configured to selectively be in fluid communication with the drive fluid inlet 236. Further, an internal channel 342 (shown in FIG. 3) is provided radially in the second outer stepped portion 418 of the main spool 328. The internal channel 342 extends between the circumferential groove 428 and the longitudinal passage 404 and provides fluid communication therebetween. In the illustrated embodiment, two internal channels 342 are provided in the second outer stepped portion 418 diametrically opposite each other. The configuration, location, orientation and number of internal channels 342 may vary as per system design and requirements.

The main spool 328 also includes an actuation passage 344. The actuation passage 344 is provided in the first outer stepped portion 416 in an inclined orientation with respect to the longitudinal passage 404. The actuation passage 344 extends between the inner and outer surfaces 406, 408 of the main spool 328. More specifically, the actuation passage 344 extends between the outer shoulder 422 and the longitudinal passage 404 providing fluid communication between the actuation chamber 340 and the longitudinal passage 404.

Further, the main spool 328 includes two pressure equalization passages 346. In the illustrated embodiment, the pressure equalization passages 346 extend between the inner and outer surfaces 406, 408 of the main spool 328 in an inclined orientation with respect to the longitudinal passage 404. It should be noted that the pressure equalization passages 346 may be oriented in any suitable configuration as per system design and requirements. More specifically, the pressure equalization passages 346 are provided between an end of the longitudinal passage 404 and the outer surface 408 of the main spool 328, thus providing fluid communication therebetween.

In the illustrated embodiment, the pressure equalization passages 346 are provided one each in the first and second outer stepped portions 416, 418 respectively. In the first outer stepped portion 416, the pressure equalization passage 346 extends between the central portion 424 on the outer surface 408 of the main spool 328 and the first chamber 336 providing fluid communication therebetween. Similarly, in the second outer stepped portion 418, the pressure equalization passage 346 extends between the central portion 424 on the outer surface 408 of the main spool 328 and the second chamber 338 providing fluid communication therebetween. The pressure equalization passages 346 are configured to equalize pressure in the central portion 424, the first chamber 336 and the second chamber 338 of the main spool 328. This may ensure that the main spool 328 remains in the first position without being displaced by different pressure acting on various portion of main spool 328.

Figure 10:
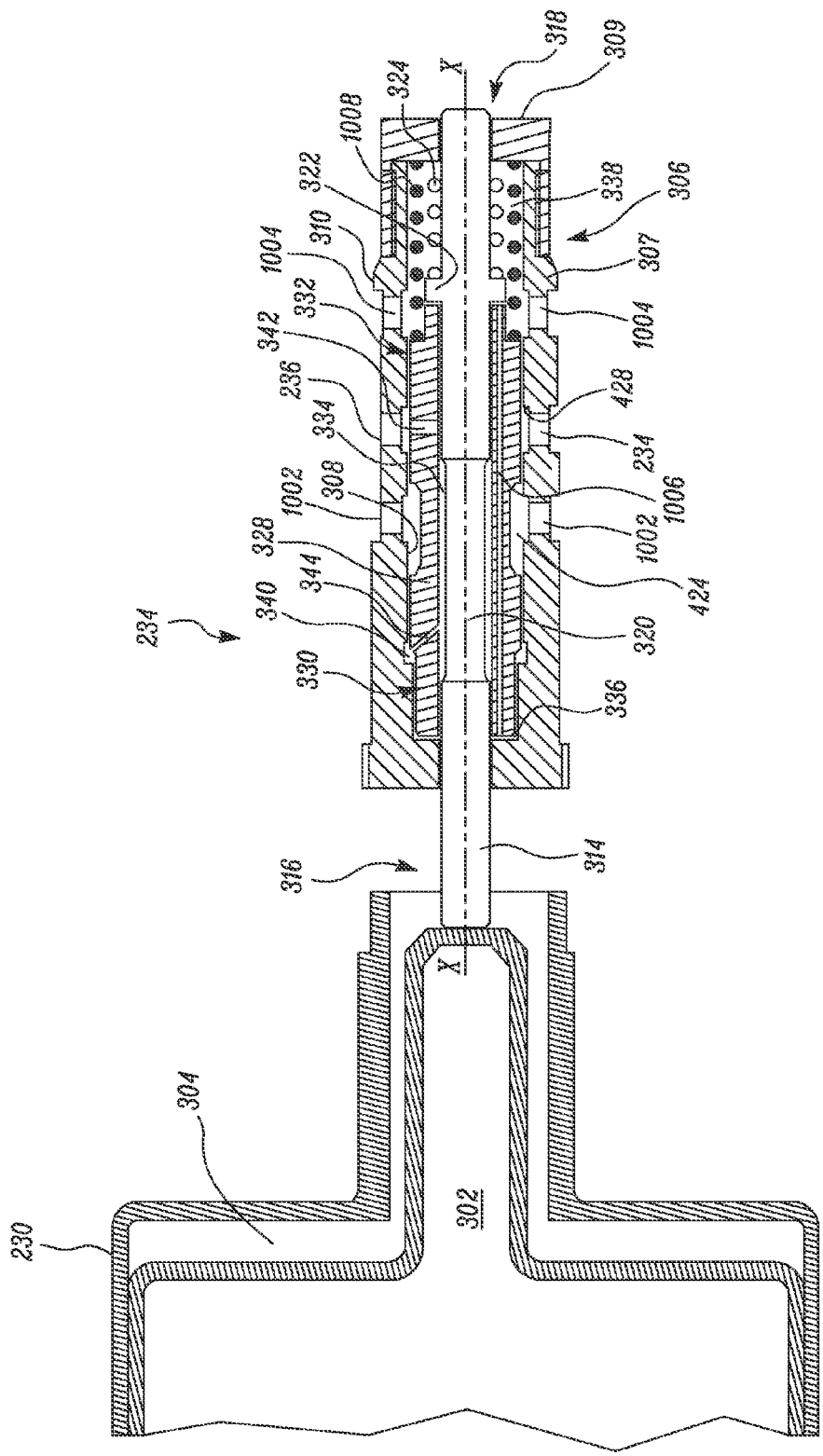
FIGS. 10-12 are different operational states of an alternate embodiment of the valve based on the position of the plunger of the reservoir.
Figure 11:
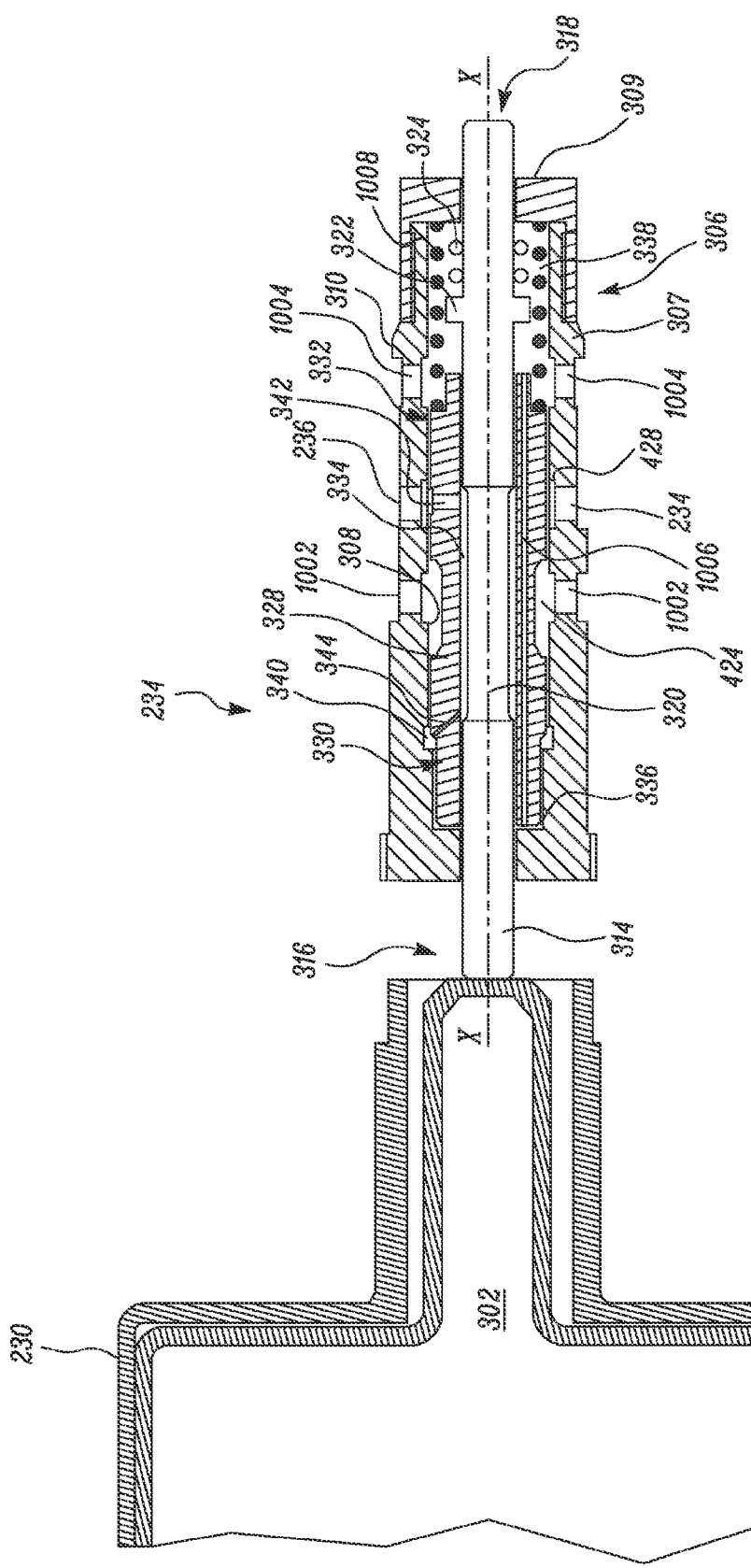
Figure 12:
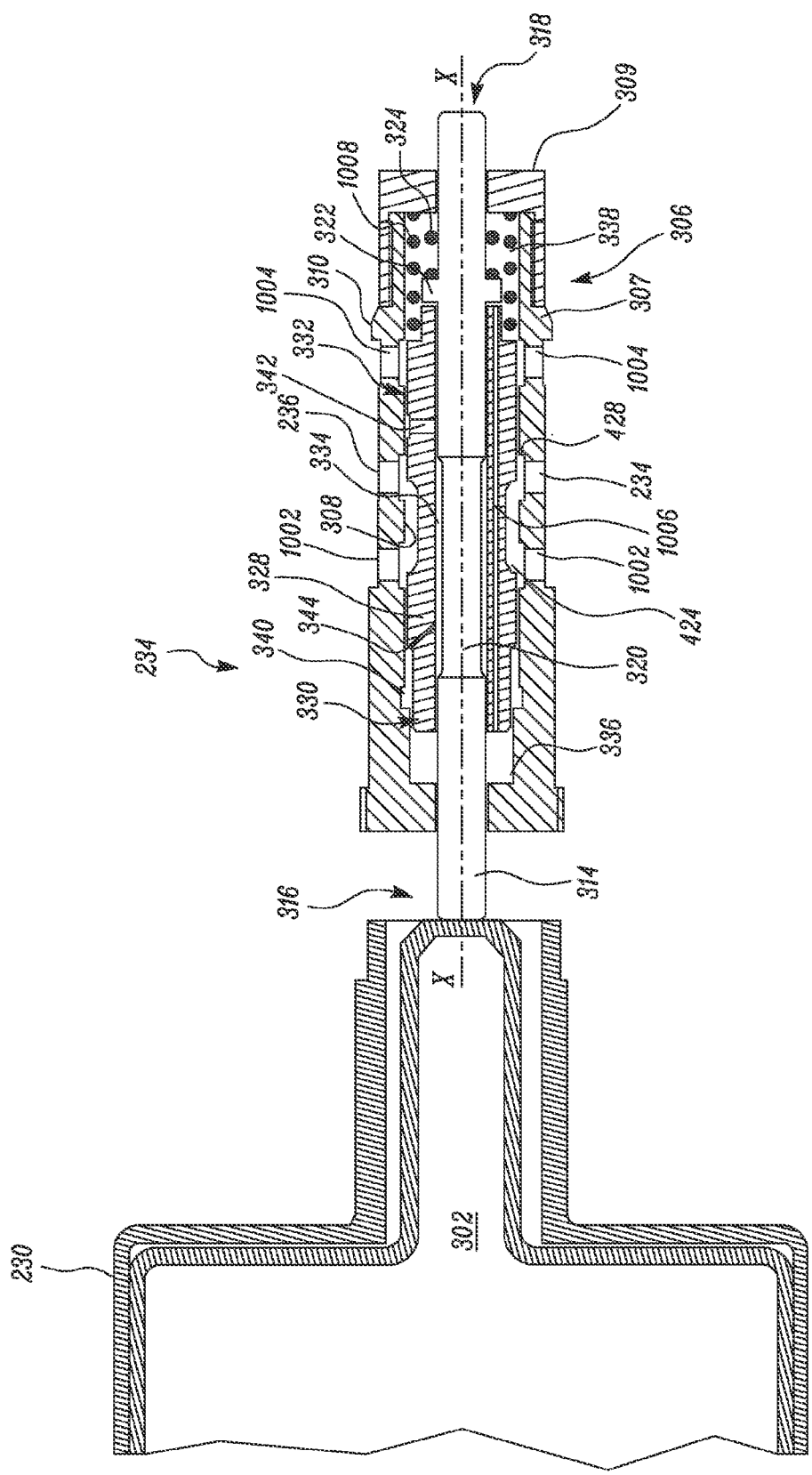

Referring to FIGS. 10 to 12, an alternate embodiment of the valve 234 is illustrated. In the alternate embodiment, the housing 306 and the main spool 328 may be modified and will be explained subsequently. The housing 306 may have the drive fluid inlet 236 and two drive fluid outlets 1002, 1004. The drive fluid outlets 1002, 1004 may be disposed in a spaced apart arrangement with respect to the drive fluid inlet 236. Furthermore, the drive fluid outlets 1002, 1004 may be provided on either sides of the drive fluid inlet 236. The drive fluid inlet 236 is configured to selectively be in fluid communication with the circumferential groove 428. The drive fluid outlet 1004 is configured to selectively be in fluid communication with the second chamber 338. The drive fluid outlet 1002 is configured to selectively be in fluid communication with the central portion 424.

Further, the main spool 328 includes a single pressure equalization passage 1006 provided longitudinally within the main spool 328. The pressure equalization passage 1006 extends between the first and second ends 330, 332 of the main spool 328. The pressure equalization passage 1006 is provided in a spaced apart arrangement with the annular channel 334. The pressure equalization passage 1006 may be configured to provide fluid communication and pressure equalization between the first chamber 336 and the second chamber 338. Additionally, a main spring 1008 may be provided between the second end 332 of the main spool 328 and the inner surface 308 of the housing 306. The main spring 1008 may be configured to urge the main spool 328 in the first position.

INDUSTRIAL APPLICABILITY

Current lubrication systems may have one or more valves to divert the drive fluid to shutdown or derate the tool. Usually, these valves have a large number of sealing members to provide sealing between a single valve member and a housing. Sealing members create considerable friction during movement of the valve members with respect to the housing. Further, the valve member is generally actuated by a plunger disposed in a lubricant reservoir or may be operated manually using suitable mechanism. The valve member may have considerable weight. A spring may urge the valve member in closed position, a spring force being proportional to the weight of the valve member and other resisting forces like that of the sealing members. The plunger may have therefore to act against the spring force in order to actuate the valve member. Further, the plunger may also have to act against pressure forces acting on the valve member. Thus, additional force is required to move the valve member. Consequently, in some cases, the plunger may not be able to actuate the valve member accurately in response to a low level of lubricant in the reservoir.

The present disclosure relates to the lubrication system 200 for the tool 112. The working of the valve 234 will now be described in relation to FIGS. 3 and 6-12. Referring to FIGS. 6-9, the change in the operational state of the valve 234 based on the level of the lubricant 304 in the reservoir 230 is illustrated. Referring to FIG. 3, the drive fluid at high pressure is received at the drive fluid inlet 236. The drive fluid then flows through the circumferential groove 428 further into the internal channel 342.

Figure 6:
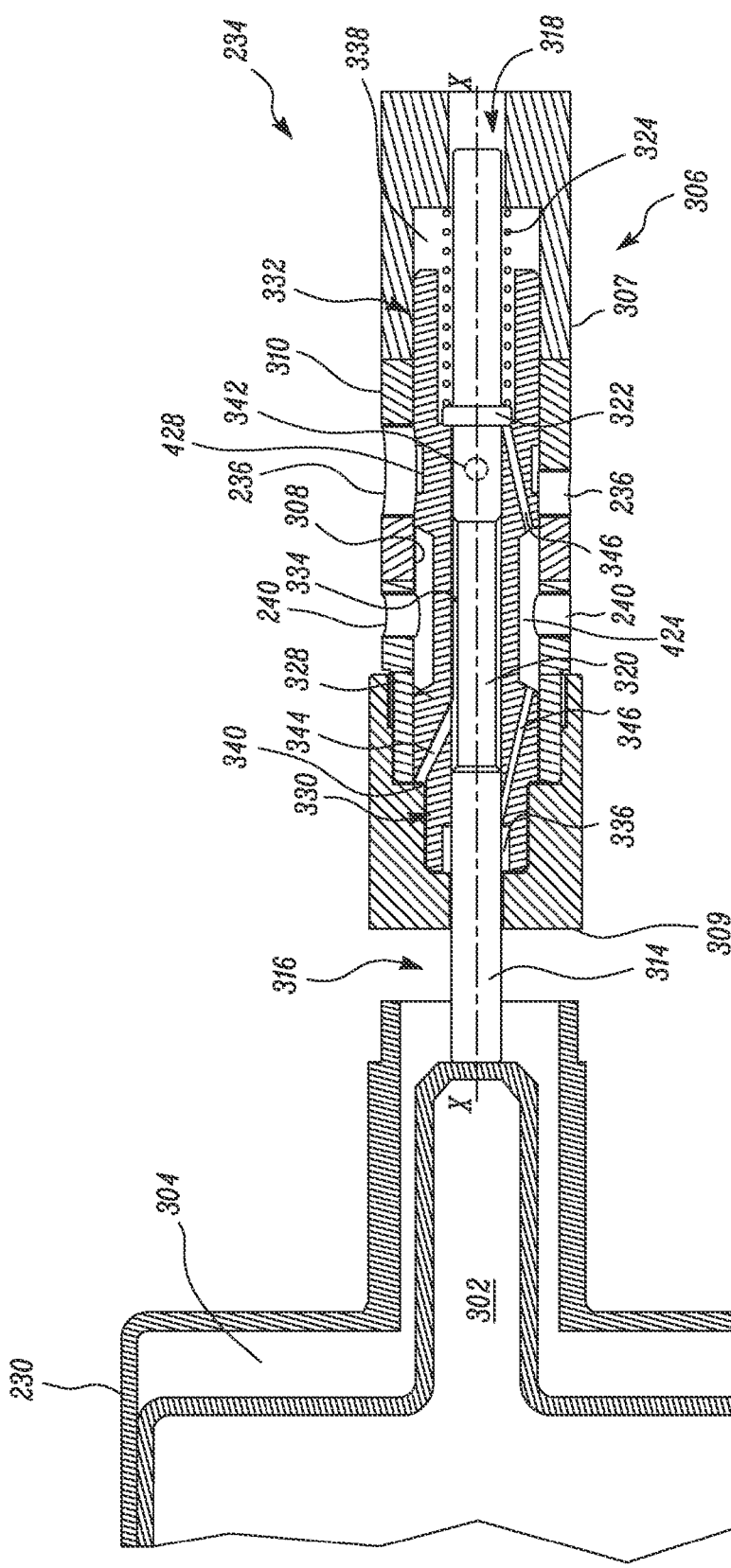
FIGS. 6-9 are different operational states of the valve based on a position of a plunger of the reservoir, according to the embodiment of FIG. 3.

Referring to FIGS. 3 and 6, the level of the lubricant is low in FIG. 6 in comparison to the level shown in FIG. 3. Therefore, the plunger 302 just contacts the pilot spool 314 without actuating it. The plunger 302 is shown in the raised position due to the presence of the lubricant 304 in the reservoir 230. In the raised position, the plunger 302 just contacts the pilot spool 314. In another embodiment, a clearance may be provided between the plunger 302 and the pilot spool 314 when the plunger 302 may be in the raised position. Accordingly, the pilot spool 314 may be retained in the neutral position by the pilot spring 324. Further, the radial projection 322 of the pilot spool 314 may cooperate with the inner shoulder 414 of the main spool 328 and may retain the main spool 328 in the first position. In the first position, the second outer stepped portion 418 of the main spool 328 fluidly blocks the drive fluid inlet 236 from the drive fluid outlet 240. In the neutral position, the pilot spool 314 also fluidly blocks the internal channel 342 from the annular channel 334. As a result, the drive fluid is prevented from flowing into the annular channel 334.

Figure 7:
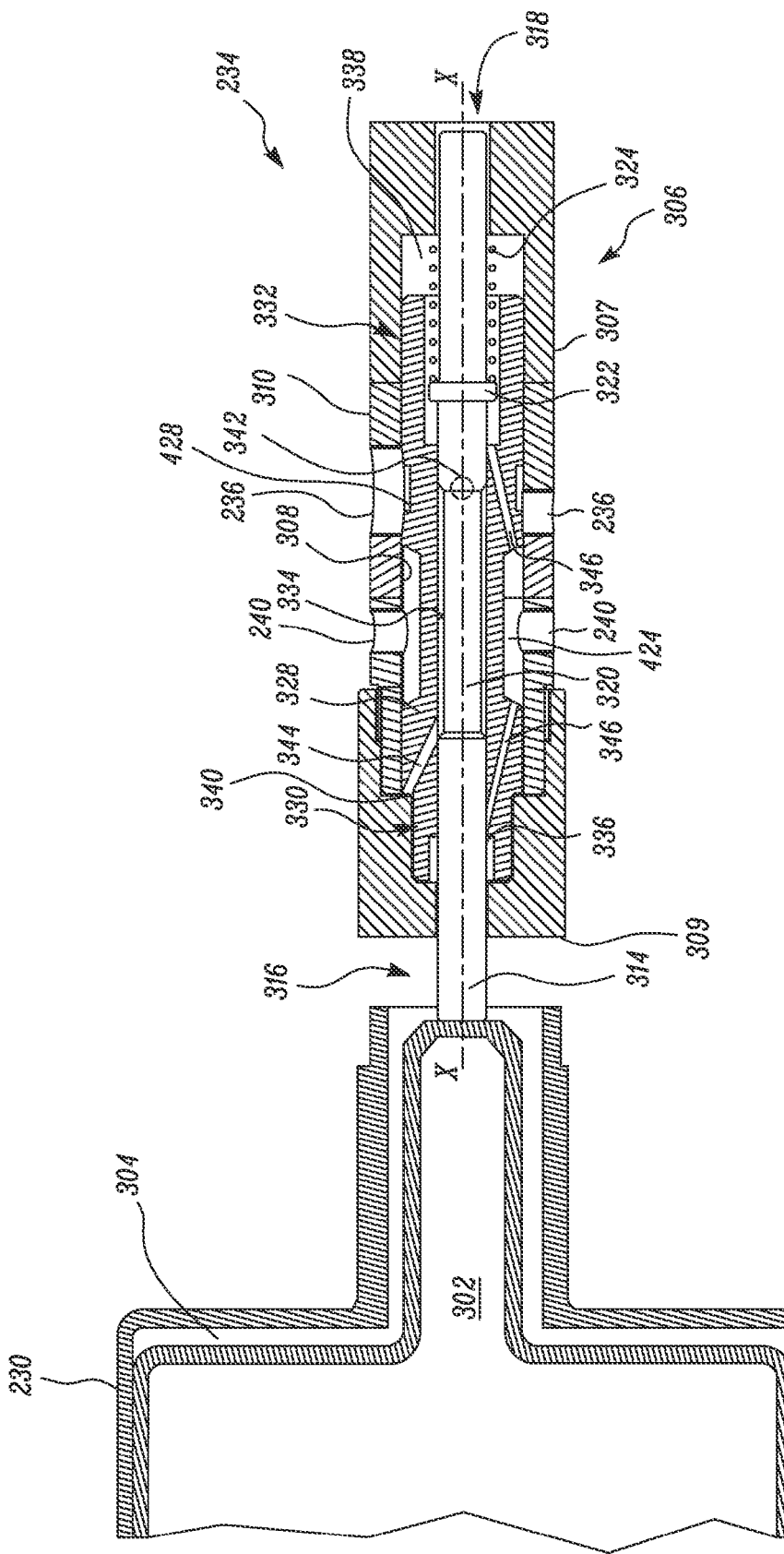

Referring to FIG. 7, as the lubricant 304 in the reservoir 230 continues to deplete, the plunger 302 moves towards the lowered position. In doing so, the plunger 302 shifts the pilot spool 314 towards the actuated position. The shifting of the pilot spool 314 further compresses the pilot spring 324. Accordingly, the pilot spool 314 unblocks the internal channel 342 and consequently, the internal channel 342 is in fluid communication with the annular channel 334. As a result, the drive fluid now flows from the internal channel 342 into the annular channel 334 and further into the actuation passage 344.

Figure 8:
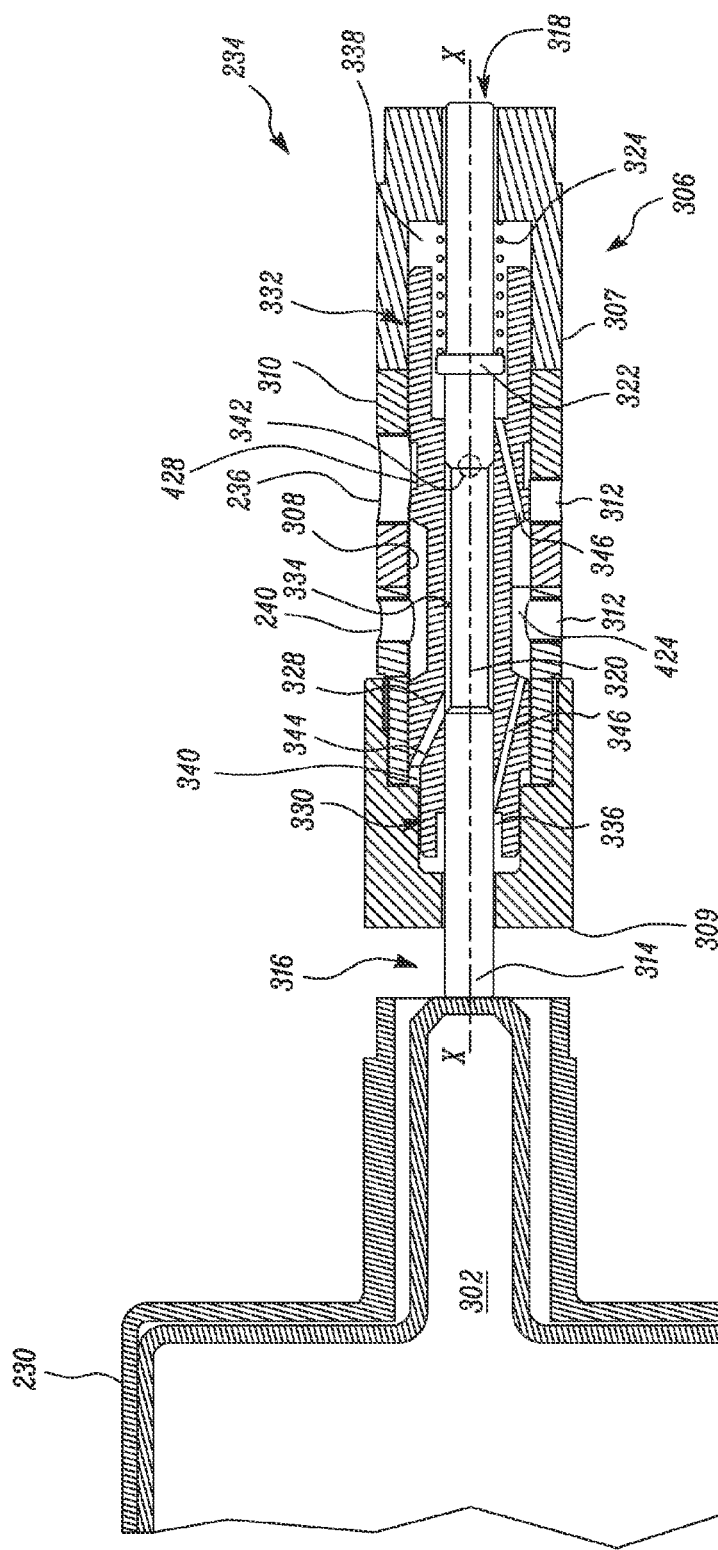

Now referring to FIG. 8, as the lubricant 304 in the reservoir 230 depletes further, the plunger 302 moves to the lowered position. In doing so, the plunger 302 shifts the pilot spool 314 to the actuated position. The shifting of the pilot spool 314 further compresses the pilot spring 324. Simultaneously, the drive fluid in the actuation passage 344 flows into the actuation chamber 340 and exerts an actuation pressure on the outer shoulder 422 of the main spool 328. The pressures in the first and second chambers 336, 338 are balanced in the first position (described in FIGS. 3 and 6-7) due to the pressure equalization passages 346. The actuation chamber 340 is sealed from the drive fluid outlet 240 and the first chamber 336. However, due to the high pressure drive fluid in the actuation chamber 340, the pressure forces on the main spool 328 do not remain balanced. Thus, the actuation pressure moves the main spool 328 towards the second position. Further, the second outer stepped portion 418 of the main spool 328 partially unblocks the drive fluid inlet 236 and fluidly communicates the drive fluid inlet 236 to the drive fluid outlet 240. This allows the drive fluid to flow in the central portion 424 of the main spool 328. The fluid communication between the drive fluid inlet 236 and the drive fluid outlet 240 provides bypassing a portion of the drive fluid from the drive fluid inlet 236 to the drive fluid outlet 240 via the central portion 424

The degree of bypassing of the drive fluid may proportionately reduce the operating capacity of the tool 112.

Also, the drive fluid flows from the central portion 424 into the pressure equalization passages 346 and further into the first and second chambers 336, 338. This fluid communication between the central portion 424, pressure equalization passages 346 and, the first and second chambers 336, 338 causes equalization of pressure on the first and second ends 330, 332 of the main spool 328. The equalization of pressure in the first and second chambers 336, 338 prevents excess vibrations and bouncing of the main spool 328 between the first and the second positions due to pressure differential.

Figure 9:
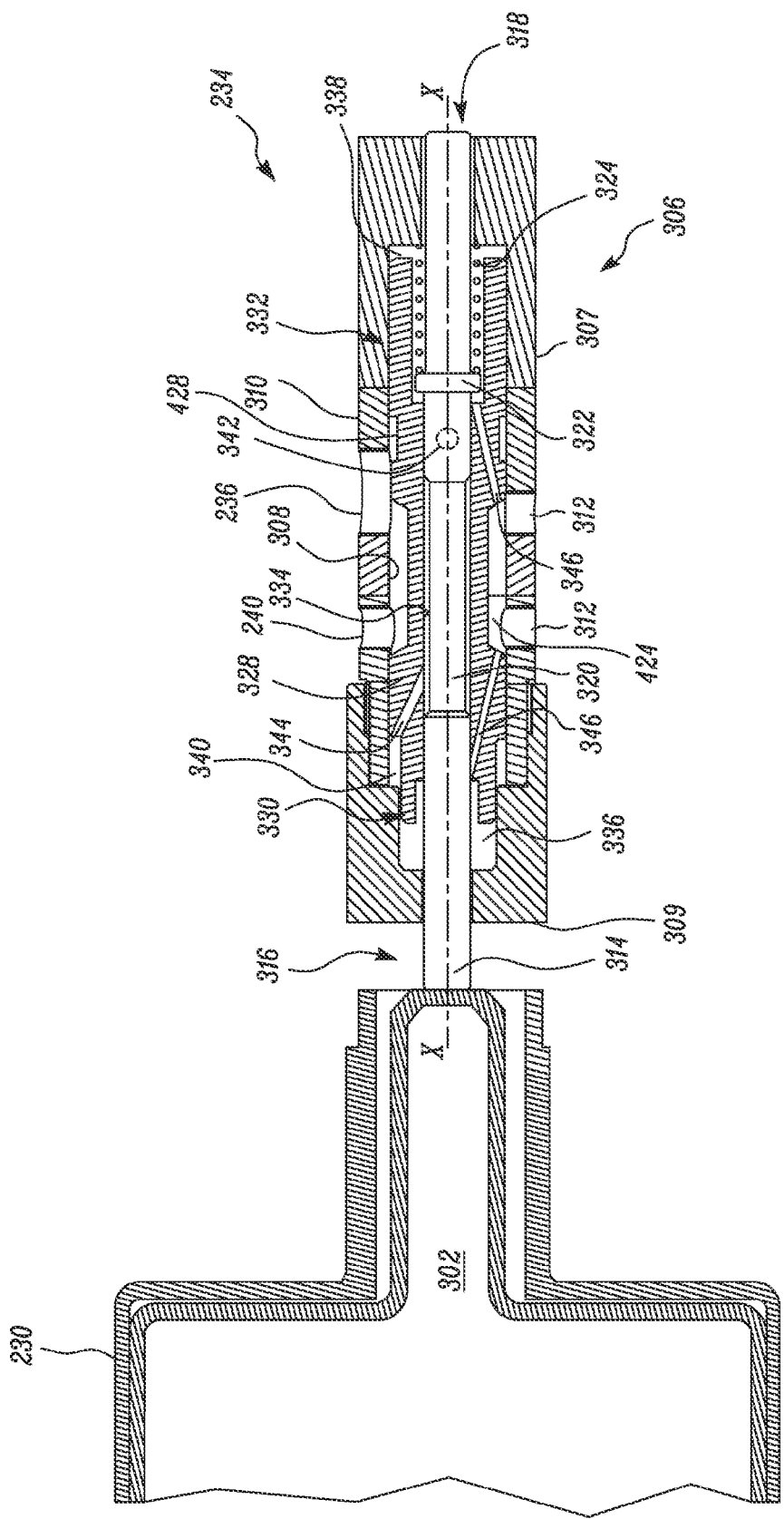

Referring to FIG. 9, as volume of high pressure drive fluid in the actuation chamber 340 further increases, an actuation pressure acting on the main spool 328 moves the main spool 328 to the second position. In the second position, the circumferential groove 428 partially disconnects from the drive fluid inlet 236. Also, the internal channel 342 is fluidly disconnected from the annular channel 334. As a result, the flow of the drive fluid from the drive fluid inlet 236 to the actuation chamber 340 ceases. This prevents further increase in the volume of the high pressure drive fluid in the actuation chamber 340, and thus the main spool 328 is retained in the second position. Further, in the second position, the second outer stepped portion 418 completely unblocks the drive fluid inlet 236, and fluidly communicates the drive fluid inlet 236 to the drive fluid outlet 240. As a result, the drive fluid received at the drive fluid inlet 236 is completely bypassed to the drive fluid outlet 240 and further to the drive fluid source 224 (shown in FIG. 2). The bypassing of the drive fluid provides to reduce the operating capacity of the tool 112.

In the illustrated embodiments, the pilot spool 314 is supported and sealed within the housing 306 using the sealing members. Lower number of the sealing members reduces the friction considerably and requires lower force to move the pilot spool 314. Further, the plunger 302 may only actuate the pilot spool 314 directly and not the main spool 328. The main spool 328 is actuated directly by the pressure of the drive fluid in response to the movement of the pilot spool 314 relative to the main spool 328. Consequently, the plunger 302 may need to act against the spring force acting on the pilot spool 314 only which may require lower force. Further, the plunger 302 may not need to overcome pressure forces acting on the main spool 328.

Further, due to an ability of the valve 234 of bypassing the drive fluid from the drive fluid inlet 236 to the drive fluid outlet 240, the dependency on the operator for keeping check on the amount of the lubricant 304 remaining in the reservoir 230 is eliminated. Reduction in operating capacity of the tool 112 may alert the operator about a low level of lubricant 304 in the reservoir 230.

FIGS. 10-12 illustrate the change in the status of the alternate embodiment of the valve 234 based on the level of the lubricant 304 in the reservoir 230. Referring to FIG. 10, when the plunger 302 is in the raised position, the pilot spool 314 is urged in the neutral position due to the pilot spring 324. Similarly, the main spool 328 may be urged in the first position by the main spring 1008. Also, the internal channel 342 may be blocked by the pilot spool 314. As a result, the drive fluid may not flow from the drive fluid inlet 236 to the actuation chamber 340. Also, the second chamber 338 may be in fluid communication to the drive fluid outlet 1004.

Referring to FIG. 11, as the plunger 302 moves to the lowered position, the plunger 302 pushes and moves the pilot spool 314 to the second position. Accordingly, the internal channel 342 gets unblocked and the drive fluid flows from the drive fluid inlet 236 to the actuation chamber 340. Referring to FIG. 12, the pressure increase in the actuation chamber 340 moves the main spool 328 against the main spring 1008 to the second position. In the second position, the drive fluid inlet 236 fluidly communicates with the drive fluid outlet 1002 to bypass the drive fluid from the drive fluid inlet 236 to the drive fluid outlet 1002. The bypassing of the drive fluid provides to reduce the operating capacity of the tool 112. The pressure equalization passage 1006 provides to equalize the pressure between the first and second chambers 336, 338. The equalization of pressure in the first and second chambers 336, 338 prevents excess vibrations and bouncing of the main spool 328 between the first and the second positions due to pressure differential. The drive fluid outlet 1004 is an additional outlet that may result in the valve 234 requiring a single pressure equalization passage 1006 since the second chamber 338 is in fluid communication with the drive fluid outlet 1004.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A tool powered by a drive fluid, the tool comprising:
   a high pressure line configured to deliver the drive fluid at high pressure to the tool;
   a low pressure line configured to return the drive fluid at low pressure from the tool;
   a lubrication system including a reservoir configured to deliver a lubricant;
   a valve comprising:
      a housing having a drive fluid inlet and a drive fluid outlet, wherein the drive fluid inlet is in fluid communication with the high pressure line and the drive fluid outlet is in fluid communication with the low pressure line;
      a pilot spool provided at least partly within the housing, the pilot spool configured to move from a neutral position to an actuated position;
      a main spool comprising a hollow portion at least partially surrounding the pilot spool, the main spool being selectively actuated by a pressure of the drive fluid to move from a first position to a second position in response to the movement of the pilot spool, wherein in the second position the drive fluid inlet is in fluid communication with the drive fluid outlet;
      a first chamber defined between a first end of the pilot spool and the housing;
      a second chamber defined between a second end of the pilot spool and the housing;
      a radial projection on the pilot spool configured to cooperate with an inner shoulder of the main spool;
      a pilot spring within the second chamber and configured to urge the pilot spool in a first direction;
      a first outer stepped portion on the main spool, the first outer stepped portion and the housing defining an actuation chamber therebetween;
      the hollow portion of the main spool comprising a longitudinal passage, the longitudinal passage and a narrow portion of the pilot spool at least partly defining an annular channel therebetween;
      the main spool further comprising an actuation passage, the actuation passage being in fluid communication with the actuation chamber and the annular channel;

a first pressure equalizing passage extending between an outer surface of the main spool and the first chamber;

a second pressure equalizing passage extending between an outer surface of the main spool and the second chamber; and a plunger disposed within the reservoir and configure to contact an end of the pilot spool and shift the pilot spool in a direction opposite to the first direction and towards the actuated position based on a level of lubricant within the reservoir.

2. The tool of claim 1, wherein fluidly communicating the drive fluid inlet and the drive fluid outlet reduces an operating capacity of the tool.

3. A lubrication system for a tool powered by a drive fluid, the lubrication system comprising:

a reservoir configured to deliver a lubricant;

a plunger disposed within the reservoir, the plunger configured to selectively generate a pilot signal based on a level of the lubricant; and a valve comprising:

a housing having a drive fluid inlet and a drive fluid outlet;

a pilot spool provided at least partly within the housing, the pilot spool configured to move from a neutral position to an actuated position in response to the pilot signal from the plunger;

a main spool within the housing and comprising a hollow portion at least partially surrounding the pilot spool, the main spool being selectively actuated by a pressure of the drive fluid to move from a first position to a second position in response to the movement of the pilot spool, wherein in the second position the drive fluid inlet is in fluid communication with the drive fluid outlet;

a first chamber defined between a first end of the pilot spool and the housing;

a second chamber defined between a second end of the pilot spool and the housing;

a first pressure equalizing passage extending between an outer surface of the main spool and the first chamber;

a second pressure equalizing passage extending between an outer surface of the main spool and the second chamber;

a spring in the second chamber and configured to urge the pilot spool into the neutral position;

a first outer stepped portion on the main spool, the first outer stepped portion and the housing defining an actuation chamber therebetween;

the hollow portion of the main spool comprising a longitudinal passage, the longitudinal passage and a narrow portion of the pilot spool at least partly defining an annular channel therebetween; and the main spool further comprising an actuation passage, the actuation passage being in fluid communication with the actuation chamber and the annular channel.

4. The lubrication system of claim 3, wherein the main spool further comprises a circumferential groove on an outer surface, the circumferential groove being selectively in fluid communication with the drive fluid inlet.

5. The lubrication system of claim 4, wherein the main spool further comprises an internal channel, the internal channel extending between the circumferential groove and the longitudinal passage.

6. The lubrication system of claim 3, wherein the main spool further comprises a second outer stepped portion, the second outer stepped portion configured to block a flow of the drive fluid from the drive fluid net to the drive fluid outlet in the first position of the main spool.

7. A lubrication system for a tool powered by a drive fluid, the lubrication system comprising:

a reservoir configured to deliver a lubricant;

a plunger disposed within the reservoir, the plunger configured to selectively generate a pilot signal based on a level of the lubricant; and a valve comprising:

a housing having a drive fluid inlet and a drive fluid outlet;

a pilot spool provided at least partly within the housing, the pilot spool configured to move from a neutral position to an actuated position in response to the pilot signal based on the level of the lubricant;

a main spool within the housing and comprising a hollow portion at least partially surrounding the pilot spool, the main spool being selectively actuated by a pressure of the drive fluid to move from a first position to a second position in response to the movement of the pilot spool, wherein in the second position the drive fluid inlet is in fluid communication with the drive fluid outlet;

a first chamber defined between a first end of the pilot spool and the housing;

second chamber defined between a second end of pilot spool and the housing;

first pressure equalizing passage extending between an outer surface of the main spool and the first chamber;

a second pressure equalizing passage extending between an outer surface of the main spool and the second chamber;

the pilot spool including a redial projection within the second chamber; and a spring within the second chamber, surrounding the pilot spool, abutting the radial projection and configured to urge the pilot spool into the neutral position.

8. The valve of claim 7, wherein the hollow portion of the main spool comprises a longitudinal passage, the longitudinal passage and a narrow portion of the pilot spool at least partly defines an annular channel therebetween.

9. The valve of claim 7, wherein the main spool further comprises a circumferential groove on an outer surface, the circumferential groove being selectively in fluid communication with the drive fluid inlet.

10. The valve of claim 9, wherein the main spool further comprises an internal channel, the internal channel and the hollow portion of the main spool comprises a longitudinal passage extending between the circumferential groove and the longitudinal passage.

11. The valve of claim 7, wherein the main spool further comprises a first outer stepped portion, the first outer stepped portion and the housing defining an actuation chamber therebetween.

12. The valve of claim 11, wherein the main spool further comprises an actuation passage, the actuation passage being in fluid communication with the actuation chamber and the longitudinal passage.

13. The valve of claim 7, wherein the main spool further comprises a second outer stepped portion, the second outer stepped portion configured to block a flow of the drive fluid from the drive fluid inlet to the drive fluid outlet in the first position of the main spool.

* * * * *